United States Patent [19]
Wadhawan

[11] Patent Number: 5,344,572
[45] Date of Patent: Sep. 6, 1994

[54] METHOD FOR TREATING WASTE PICKLE LIQUOR

[76] Inventor: Satish C. Wadhawan, 142 Phillips Pl., Pittsburgh, Pa. 15217

[21] Appl. No.: 911,530

[22] Filed: Jul. 10, 1992

[51] Int. Cl.$^5$ .................... C02F 1/52; B01D 21/01
[52] U.S. Cl. .................... 210/727; 210/735; 210/912; 210/913; 423/DIG. 1; 423/DIG. 2
[58] Field of Search ............... 210/722, 725, 727, 732, 210/734, 736, 737, 735, 912, 913; 423/DIG. 1, DIG. 2

[56] References Cited

U.S. PATENT DOCUMENTS

| | | | |
|---|---|---|---|
| 2,692,229 | 10/1954 | Heise et al. | 210/722 |
| 3,087,890 | 4/1963 | Pye | 210/727 |
| 3,377,274 | 4/1968 | Burke et al. | 210/727 |
| 3,617,559 | 11/1971 | Cywin | 423/DIG. 2 |
| 3,617,568 | 11/1971 | Ries | 210/727 |
| 4,342,653 | 8/1982 | Halverson | 210/734 |
| 4,569,768 | 2/1986 | McKinley | 210/727 |
| 4,758,353 | 7/1988 | Spence et al. | 210/727 |

*Primary Examiner*—Peter A. Hruskoci
*Attorney, Agent, or Firm*—Daniel J. Long

[57] ABSTRACT

A method for treating waste pickle liquor solution comprising the steps of (a) adding a flocculating agent to the pickle liquor solution; (b) allowing at least some of the silica in the pickle liquor to begin to flocculate; (c) again adding a flocculating agent to the pickle liquor solution; (d) allowing the floccules containing silica formed in step (b) to increase in size; and (e) physically separating floccules formed in step (d) from the pickle liquor solution.

14 Claims, 1 Drawing Sheet

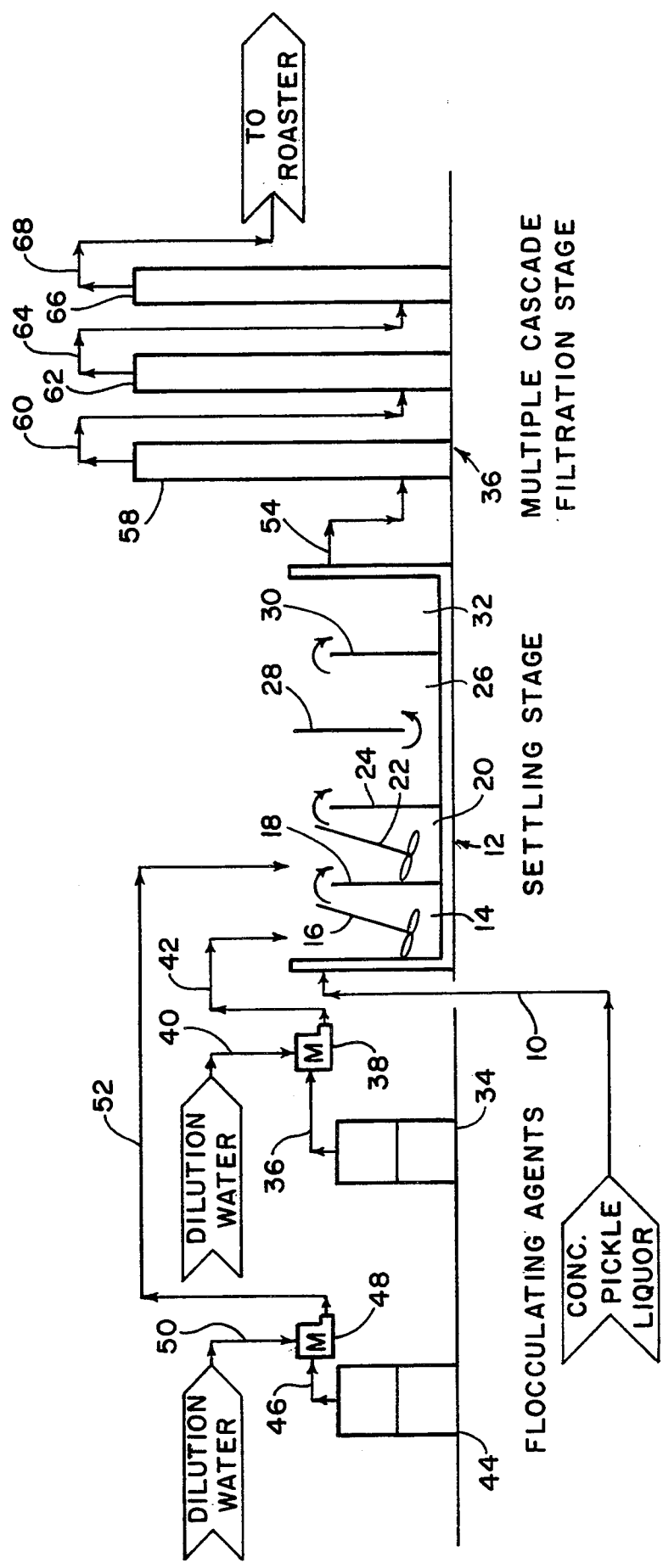

METHOD FOR TREATING WASTE PICKLE LIQUOR

BACKGROUND OF THE INVENTION

The present invention relates to methods for treating waste pickle liquor solutions and, in particular, to methods for treating waste pickle liquor solutions to reduce silica concentrations therein.

In the manufacture of steel, surface scale formed during the rolling process is generally removed by means of a concentrated sulfuric or hydrochloric acid solution known as pickle liquor. The treatment of such waste pickle liquor can pose significant environmental challenges.

One of the materials which generally needs to be removed from waste pickle liquor consists of silica. Heretofore silica has been removed by chemical precipitation, but such chemical precipitation processes may be both expensive and time consuming.

It is, therefore, the object of the present invention to remove suspended and colloidal silica from waste pickle liquor by means of a less expensive physical separation process.

SUMMARY OF THE INVENTION

In the method of the present invention, waste pickle liquor or concentrated waste pickle liquor is treated by first adding a flocculating agent which is preferably an anionic or cationic polymer to the pickle liquor solution to a concentration from a 20 ppm to 100 ppm and allowing suspended or colloidal silica in the pickle liquor solution to begin to flocculate for a period of 15 minutes to 1 hour to a diameter of from about 0.5 to 2.0 microns. A flocculating agent which is preferably an anionic or cationic polymer is again added to the pickle liquor solution until the concentration of that second flocculating agent is from 5 ppm to 30 ppm, and the suspended or colloidal silica is allowed to further flocculate for another 15 minutes to 1 hour to a diameter of from about 25 to 100 microns. The floccules are then removed from the pickle liquor solution by filtering or other physical separation technique.

BRIEF DESCRIPTION OF THE DRAWING

The method of the present invention is further described with reference to the attached drawing which is a schematic representation of apparatus in which a preferred embodiment of the method may be carried out.

DETAILED DESCRIPTION OF THE DRAWINGS

Unless otherwise specified, all concentrations are by weight. Referring to the drawing, it will be seen that concentrated pickle liquor containing hydrochloric acid and various contaminants including silica is transported in line 10 to a settling tank shown generally at numeral 12. This settling tank consists of a first chamber 14, which is equipped with an agitator 16 and is separated by partition 18 from a second chamber 20. This second chamber also is equipped with an agitator 22 and is separated by partition 24 from an enlarged third chamber 26 which has no agitator but which has a raised medial partition 28 and which is separated by partition 30 from a fourth chamber 32. Flocculating agents are provided to the first chamber from a drum 34 and are transported therefrom in line 36 by pump 38 and are mixed with dilution water introduced together through line 40. The polymer and the dilution water are introduced to the first chamber through line 42. Flocculating agent is provided for use in the second chamber from drum 44 from where it is removed through line 46 by pump 48 and is mixed with dilution water introduced through line 50 and is thereafter introduced with dilution water into the second chamber through line 52.

The concentrated pickle liquor introduced in line 10 will generally be at a temperature of about 200° F. The flocculating agent in drum 34 will preferably be a low molecular weight cationic polymer which may have an average molecular weight of from 2,000 to 10,000. A suitable polymer would be a polyamine available from Calgon Corporation under the product code CA-289. The polymer would preferably be diluted so that it is at a concentration in line 42 of about 0.1% in line 42 and of from 20 to 100 ppm in first chamber 14. The temperature of the pickle liquor in first chamber 14 is also preferably in the range of 150° F. to 200° F. and more preferably about 200° F. and it is continuously agitated by means of the agitator 16. After a period of time from about 15 minutes to 1 hour the diluted pickle liquor in first chamber 14 is removed to second chamber 20 where it is mixed with a flocculating agent from drum 44. Preferably this flocculating agent is a high molecular weight anionic polymer which may have an average molecular weight of from 1,000,000 to 20,000,000, and one suitable example would be a polyelectrolyte sold by Calgon Corporation under the product code POL EZ 7736. This polymer would be added in an amount along with the diluting water so that it is at a concentration of about 0.1% in line 52 and about 5 ppm to 30 ppm in the second chamber 20. The temperature of the pickle liquor in the second chamber would also preferably be in the range of 150° F. to 200° F. and more preferably about 200° F. After the pickle liquor resides in the second chamber for about 15 minutes to about 1 hour while continuously being agitated by agitator 22, it is removed through the third chamber to the fourth chamber.

It has been found that under the above described conditions, suspended and colloidal silica in the pickle liquor solution would begin to flocculate in the first chamber the solution on average and within the 15 minutes to 1 hour in which resides there will form pin floccules of from about 0.5 to 2 microns and preferably 1 micron in diameter. In the second chamber it is found that this flocculation will continue, and that floccules containing silica having a diameter of from 25 to 100 microns and preferably 50 microns will develop in 15 minutes to 1 hour after the pin solution containing floccules produced in the first chamber are introduced to the second chamber. After such an average time in the second chamber, the solution would be removed to the third chamber 26.

The pickle liquor along with these floccules are removed from the settling tank through line 54 to a multiple cascade filtration unit shown general at numeral 56. It will be seen that the pickle liquor flows upwardly through the first stage 58 from where it is transferred downwardly in line 60 to lower end of the second stage 62 and flows upwardly to line 64 where it is again introduced to the lower end of the third stage 66 and from the top of the third stage it goes through line 68 to a roaster for further processing. In this filtering unit floccules containing silica formed in the settling tank will be largely removed so that the final concentration of silica in the pickle liquor solution introduced to the roaster will be less than 15 ppm.

It is also seen that some trace impurities such as calcium, aluminum, potassium, chromium and nickel would be adsorbed/absorbed onto the silica containing floccules and the final concentration of these impurities would be reduced.

The method of the present invention is further explained with reference to the following examples. Unless otherwise stated, all concentrations are by weight.

EXAMPLE 1

100 ml of waste pickle liquor was mixed rapidly with CALGON CA-289 for 15 minutes at a rate of 60 mg/l. Then CALGON Pol EZ 7736 was added at a rate of 12 mg/l. The mixture was continually stirred for 20 minutes. The solution was filtered. The starting and resulting concentrations of HCl, $FeCl_2$ and the silica are shown in the following Table I.

EXAMPLE 2

The test of Example 1 was repeated with concentrated waste pickle liquor. The starting and resulting concentration of HCl, $FeCl_2$ and silica are shown in the following Table II.

EXAMPLE 3

CALGON CA-289 was added at a rate of 40 mg/l to concentrated waste pickle liquor flowing at a rate of 30 gallons per minute and stirred in a chamber with aging time of 30 minutes followed with treatment with CALGON Pol EZ 7736 with rapid stirring for 30 minutes the following results are shown in Table III.

TABLE I

| | HCl (%) | $FeCl_2$ (%) | $SiO_2$ (ppm) |
|---|---|---|---|
| Untreated Waste Pickle Liquor | 2.4 | 21.2 | 55 |
| Treated and Filtered Waste Pickle Liquor | 2.4 | 21.2 | 18 |

TABLE II

| | HCl (%) | $FeCl_2$ (%) | $SiO_2$ (ppm) |
|---|---|---|---|
| Untreated Concentrated Waste Pickle Liquor | 7.8 | 28.2 | 42 |
| Treated and Filtered Concentrated Waste Pickle Liquor | 7.8 | 28.2 | 15 |

TABLE III

| | HCl (%) | $FeCl_2$ (%) | $SiO_2$ (ppm) |
|---|---|---|---|
| Untreated Concentrated Waste Pickle Liquor | 8.2 | 29.8 | 52 |
| Treated and Filtered Concentrated Waste Pickle Liquor | 8.2 | 29.2 | 12 |

What is claimed

1. A method for treating waste pickle liquor solution containing silica comprising the steps of:
   (a) adding a cationic polymer flocculating agent having an average molecular weight of from about 2,000 to about 10,000 to the pickle liquor solution;
   (b) allowing at least some of the silica in the pickle liquor to form floccules containing silica having a diameter of from about 0.5 microns to about 2.0 microns;
   (c) adding an anionic polymer flocculating agent having an average molecular weight of from about 1,000 to about 20,000,000 to the pickle liquor solution;
   (d) allowing the floccules containing silica formed in step (b) to increase in size to a diameter of from about 25 microns to about 100 microns; and
   (e) physically separating floccules formed in step (d) from the pickle liquor solution.

2. The method of claim 1 wherein before step (a) there is performed the additional step of diluting the flocculation agent with water to a concentration of about 0.1% by weight.

3. The method of claim 1 wherein in step (a) the polymer is added to a concentration in the pickle liquor solution of from about 20 ppm to about 100 ppm.

4. The method of claim 1 wherein in step (c) the polymer is added to a concentration in the pickle liquor solution of from about 5 ppm to 30 ppm.

5. The method of claim 1 wherein in step (b) floccules containing silica are formed to a diameter of about 1 micron.

6. The method of claim 1 wherein in step (b) floccules are allowed to begin forming for a period of from about 15 minutes to about 1 hour.

7. The method of claim 1 wherein in step (d) floccules are formed to a diameter of about 50 microns.

8. The method of claim 16 wherein in step (d) floccules are allowed to form for a period of from about 15 minutes to about 1 hour.

9. The method of claim 1 wherein in step (e) the floccules are physically separated from the pickle liquor solution by means of filtration.

10. The method of claim 1 wherein the pickle liquor solution is maintained at a temperature of from about 150° F. to about 200° F.

11. The method of claim 1 wherein the silica is suspended silica.

12. The method of claim 1 wherein the silica is colloidal silica.

13. The method of claim 1 wherein the solution being treated is a concentrated waste pickle liquor solution containing hydrochloric acid.

14. The method of claim 1 wherein trace impurities selected from the group consisting of calcium, aluminum, potassium, chromium and nickel are also removed from the pickle liquor solution.

* * * * *